2,755,263

PRODUCTION OF ADHESIVES FROM UREA-FORMALDEHYDE RESINS

Hans Scheuermann, Ludwigshafen (Rhine)-Oggersheim, Germany, assignor to Badische Anilin- & Soda-Fabrik Aktiengesellschaft, Ludwigshafen (Rhine), Germany No Drawing. Application October 18, 1952, Serial No. 315,571

Claims priority, application Germany October 20, 1951

11 Claims. (Cl. 260—29.4)

This invention relates to a process for the production of adhesives from condensation products of formaldehyde and urea.

It is known to use condensation products of formaldehyde and urea or urea derivatives, if desired in combination with acid hardening agents, as adhesives. The aqueous solutions or the solutions prepared by dissolving the dry powders used for this purpose contain the condensation products in part in only a limited water-soluble form. Thus for example in a 20 to 50% solution, the major portion of the resin or the whole of the resin may be present in dissolved form, whereas upon greater dilution the more highly condensed fraction is precipitated in coagulated form. Of the water-soluble fraction, a relatively large part is usually present in such a low stage of condensation that it remains in the aqueous solution after separation of the hydrophobic resin, even upon greater dilution. This low-condensed fraction, when the condensation solution is used as an adhesive for veneer, penetrates into the wood, and thin high-quality veneers may be penetrated to such an extent that they are incapable, especially after hot bonding, of absorbing mordants, in particular aqueous mordants, in uniform form. There are then formed on the surface of the veneered wood stains which may render the furniture prepared therefrom unsaleable. Furthermore the adhesive constituents which penetrate into the wood are lost as far as the proper purpose of wood bonding is concerned. Attempts have been made to avoid this drawback by the addition of fillers which thicken or gelatinize under the influence of heat, such as starch. The water-repellency of the bondings prepared therewith is, however, reduced by the added starch.

If an attempt is made to avoid this drawback by carrying the condensation of the resin to a very high degree, the resin soon separates from the aqueous solutions in a gelled, rapidly coagulating form and can hardly be kept in uniform dispersion even by the co-employment of emulsifying agents. Even when this is possible, these aqueous solutions have only a very short life.

I have now found that adhesives which are free from the said defects are obtained from condensation products of formaldehyde with urea or urea derivatives by subjecting the condensation products which are still soluble in water, during or after the drying, to a thermal treatment until they are practically no longer soluble in cold water but can only be substantially dispersed therein with swelling. The preparation of the condensation products to be thermally aftertreated is preferably carried out by reacting urea and formaldehyde in aqueous medium at a pH of 2.5 to 5, preferably 3 to 4. The molar ratio of urea to formaldehyde in these condensation products should be as a rule 1:1.75 to 1:2.5, but is preferably about 1:2. It is advantageous so to regulate the degree of condensation of the reaction products which are to be aftertreated that they are still just soluble in water. Thus for example a product obtained by the reaction of urea with 38% aqueous formaldehyde (molar ratio 1:2) which is to be subjected to the thermal aftertreatment according to this invention is preferably condensed to such an extent that this solution, when cooled to 20° to 25° C., shows a slight opacity due to the commencement of the separation of resin.

The thermal treatment should preferably be carried out at temperatures between 100° and 200° C. For this purpose, for example, the solutions still containing the whole of the resin in dissolved form, which solutions are advantageously neutral or weakly acid and preferably have a pH between 2.5 and 5.5, can be sprayed at such temperatures that a further condensation takes place during the drying of the resin to a powder. The spraying temperatures at neutral reaction for this purpose are considerably higher than the temperatures otherwise employed for spray drying for the evaporation of the water, and are advantageously between 140° and 200° C. Depending on the choice of this temperature, adhesive powders are obtained which have a considerably higher water binding capacity than the resin in the initial solution. Whereas, for example, the usual adhesive viscosity is not obtained in the initial solution until the resin content is 60 to 70%, the adhesive powder obtained as described above yields the same viscosities in 40 and 20% dispersion. The duration of the thermal treatment depends on the temperature and the pH. The necessary time of treatment is shortened by raising the temperature and lowering the pH. As the most favorable times of treatment with a neutral reaction there may be mentioned about 1 to 5 hours at 100° to 120° C., several minutes at 130° to 140° C. and a few seconds at temperatures of 160° C. and more.

The same effect can be obtained when the powder which has been obtained by normal spraying of the aqueous condensation solution and which upon redissolution yields the same viscosity as the initial solution, is then subjected to an ageing at higher temperature, as for example 100° to 120° C. The dry powder obtained at higher spraying temperatures than those conventionally used may also be heated subsequently.

Such resin powders, when made up with water, yield products which are similar to those otherwise obtained by mixing with the addition of rye flour or potato flour with cold water. In contrast to water-soluble condensation products, the viscosity of these new dispersions ordinarily does not fall upon heating, but on the contrary increases, the dispersions turning vitreous by the intensified combination with water and the swelling of the resin particles, similarly to a pasting. By reason of this property, the said dispersions are eminently suitable for bonding. They do not penetrate thin veneers and by reason of their high water-binding power they may be applied very sparingly, excellent dry and wet strengths thus being obtained. In order to give the dispersions good brushing properties it is of advantage, especially with very highly condensed resin powders, to add thereto, before they are dissolved, small amounts of products which promote their dispersibility and stabilize the dispersion. For this purpose, water-soluble cellulose ethers or esters, for example, are specially suitable.

Additions of 10 to 20% of urea also improve the brushing properties and bind any formaldehyde still present.

The brushing properties of the adhesives prepared according to this invention may be improved by the addition of water-soluble condensation products of aminoplast-forming substances. As water-soluble aminoplast-forming condensation products there may be mentioned especially those obtained by the reaction of formaldehyde or substances yielding formaldehyde with urea or melamine. The condensation products of substituted ureas, urethanes, diurethanes, acetylene diurea, dicyandiamide, substituted melamines and the like may, however, also be used. The molar ratio of formaldehyde to the aminoplast-forming substances should preferably be about 1 mol of formaldehyde to 1 amino group; it may, however, be varied within wide limits, as for example 1:0.7 to 1:1.5. As a rule about 15 to 60% of the water-soluble condensation products are used with reference to the condensation products which only swell in water and the content of resin and of resin forming substances of adhesive solutions prepared from such mixtures as preferably from about 20 to 40%. Compared with the adhesives obtained as a rule with the conventional condensation of aminoplast-forming substances, which contain products of different degrees of condensation, the mixtures of thermally-aftertreated and low-molecular condensation products are distinguished by higher strength. The adhesives may also contain small additions of cellulose or starch derivatives which swell in water. Thus, for example, afterheated condensation products from 1 mol of urea and 2 mols of formaldehyde, which are capable of binding 5 parts of water to 1 part of glue, by the addition of 20 to 40% of a water-soluble adhesive powder from a condensation product of urea and formaldehyde and 1% of a wood ether carboxylic acid (prepared according to U. S. patent specification 2,294,666), will give adhesive powders which are easy to spread and have a water-binding power that is 3 to 4 times higher than that of normal adhesive powders from aminoplast-forming substances. The strength of cold bondings prepared with these adhesive mixtures is, in spite of the high water content of the adhesives, equal to that of conventional adhesives, so that these new adhesives are especially applicable to cold bonding.

Mixtures of thermally aftertreated urea-formaldehyde condensation products with about 20 to 30% of a water-soluble condensation product from melamine and formaldehyde (molar ratio about 1:3) are superior in strength to the conventional water-soluble melamine resin adhesives by 3 to 5 times and yield excellent dry, wet and boiling strengths even with acid hot bonding.

The following examples will further illustrate this invention but the invention is not restricted to these examples. The parts are by weight.

*Example 1*

To 100 parts of an about 70% solution of a urea-formaldehyde condensation product, which after the addition of 3 parts of water shows a separation of resin just beginning and which has the adhesive viscosity usual in practice, there are added 10 parts of a 10% aqueous solution of secondary ammonium phosphate. Plywood veneers are coated therewith one one side (about 200 grams per square metre) in the usual way and bonded to plywood at 100° C. The bonding data obtained are as follows:

| Dry | After 48 hours in water | After 96 hours in water |
| --- | --- | --- |
| 45 kg./cm.² | about 35 kg./cm.² | 28 kg./cm.² |

If so much water is added to this resin solution that a 27% solution is formed and this, after adding the same amount of the same hardener, is similarly applied in an amount of 200 grams per square metre and then bonded, plywoods are obtained which partly come apart after removal from the press. There is no longer any water-repellency in the bondings obtained. By observation of the bonded surface, it is no longer possible to detect applied resin. It has completely penetrated into the wood.

If, on the other hand, an adhesive powder is prepared from the condensation product solution by spraying into hot air, for example in a "Krause" tower, at 140° to 150° C., and this adhesive powder is subsequently heated for 3 hours at 100° C. while being turned, for example in a rotary oven, the powder then yields in a 38% dispersion an adhesive solution which can be easily spread. After a heating period of four hours, an adhesive dispersion (27%) which still allows of satisfactory application is obtained by adding 100 parts of this adhesive powder to 250 parts of water and allowing it to stand overnight.

If these 38% or 27% resin dispersions are used for bonding in the same way as in the first part of this example, the following strength values of the bonding are obtained:

| Solution | Dry, kg./cm.² | After 48 hours in water, kg./cm.² | After 96 hours in water, kg./cm.² |
| --- | --- | --- | --- |
| 38% | 45 | 35 | 35 |
| 27% | 45 | 35 | 25 |

If the three above adhesive solutions are used for bonding so-called covering veneers of oak of 0.8 to 1.0 millimetre in thickness with the same applied thickness, the oak veneer, in the case of the use of the first bonding solution, especially when it is diluted by a small addition of water, shows such a penetration of adhesive that mordanting is practically impossible. When using the adhesives from the afterheated powders, no penetration will occur.

*Example 2*

To 100 parts of a pulverulent urea-formaldehyde condensation product (molar ratio 1:2) which has been heated for 5 hours at 120° C. there are added 50 parts of a water-soluble pulverulent urea-formaldehyde condensation product and 2 parts of wood ether carboxylic acid. Such an adhesive powder mixture binds 200 parts of water for each 100 parts.

If cold bondings are carried out with this adhesive solution by the priming method in which an about 15% ammonium chloride hardener solution is applied to one side of the wood to be bonded and the adhesive to the other side, there is obtained a dry tenacity of 53 kg./cm.² after 24 hours and a wet strength of 47.5 kg./cm.² after soaking in water for 48 hours. The standard adhesives which contain about four times as much adhesive resin, yield under the same bonding conditions a dry tenacity of 53 kg./cm.² after 24 hours and a tenacity of 55 kg./cm.² after soaking in water for 48 hours. This comparison shows that with the new adhesives about the same good strength as with the standard adhesives can be obtained with a considerable saving in adhesive resin.

*Example 3*

A condensation solution which just undergoes capacity at 20° to 25° C. due to high molecular weight resin components, is prepared by the acid condensation, at a pH of 3.5, of 1 mol of urea and 2 mols of 40% aqueous formaldehyde solution at a rate that it may directly be carried to a spray drying. While maintaining an average drying temperature of 120° C., an adhesive powder is obtained which has the properties of the adhesive powders obtained according to Examples 1 and 2.

*Example 4*

126 parts of melamine are boiled for ½ to ¾ hour at a pH 7.0 with 300 parts of 30% aqueous formaldehyde (molar ratio 1:3). To 100 parts of this solution there are added 100 parts of the same afterheated adhesive powder as in Example 2 and 5 parts of wood ether carboxylic acid. After adding 250 to 300 parts of water, an adhesive solution which can easily be spread is obtained; after adding secondary ammonium phosphate as a hardener, the following tenacities are obtained by subsequent hot bonding:

Kg./cm.²
Dry _____ 35
After soaking for 48 hours _____ 37
After soaking for 96 hours _____ 34
After boiling for 1 hour _____ 28

What I claim is:
1. A process for the production of adhesives from condensation products of urea and formaldehyde which comprises subjecting an initial stage condensation product of urea and formaldehyde, wherein the mole ratio of urea to formaldehyde is approximately in the range of 1:1.75 to 1:2.5 and which is still soluble in water after drying, to a thermal treatment in which said dried condensation product is heated to a temperature between 100° C. and 200° C. until it is practically insoluble in cold water but is substantially only dispersible in water with swelling.

2. A process for the production of adhesives from condensation products of urea and formaldehyde which comprises spray drying an aqueous solution of an initial stage condensation product of urea and formaldehyde, wherein the mole ratio of urea to formaldehyde is approximately in the range of 1:1.75 to 1:2.5 and which is still soluble in water, and after said drying, subjecting said dried product to a thermal treatment in which said dried condensation product is heated to a temperature between 140° C. and 200° C., until it is practically insoluble in cold water but is substantially only dispersible in water with swelling.

3. A process for the production of adhesives from condensation products of urea and formaldehyde which comprises spray drying an aqueous solution of an initial stage condensation product of urea and formaldehyde, wherein the mole ratio of urea to formaldehyde is approximately in the range of 1:1.75 to 1:2.5, and which is still soluble in water and after said drying, subjecting said dried product to a thermal treatment in which said dried condensation product is heated to a temperature between 100° C. and 200° C., until it is practically insoluble in cold water but is substantially only dispersible in water with swelling.

4. A process for the production of adhesives from condensation products of urea and formaldehyde which comprises spray drying at a temperature of between 140° C. and 150° C. an aqueous solution of an initial stage condensation product of urea and formaldehyde, wherein the mole ratio of urea to formaldehyde is about 1 mole of urea and 2 moles of formaldehyde and which is still soluble in water, and heating the obtained powder for about one to three hours to a temperature between 100° C. and 120° C. to obtain a product which is practically insoluble in cold water but is substantially only dispersible in water with swelling.

5. A process for the production of adhesives from condensation products of urea and formaldehyde which comprises subjecting an initial stage condensation product of urea and formaldehyde, wherein the mole ratio of urea to formaldehyde is approximately in the range of 1:1.75 to 1:2.5 and which is still soluble in water after drying, to thermal treatment in which said dried condensation product is heated to a temperature between 100° C. and 200° C. until it is practically insoluble in cold water but is substantially only dispersible in water with swelling, and then dispersing the thus obtained product in an aqueous medium, this aqueous medium containing in addition, a water-soluble initial stage aminoplast forming a condensation product.

6. A process as claimed in claim 5 wherein the thermally aftertreated condensation product of urea and formaldehyde is dispersed in an aqueous medium containing in addition a water-soluble initial stage condensation product of melamine and formaldehyde.

7. A process as claimed in claim 5 wherein the thermally after treated condensation product of urea and formaldehyde is dispersed in an aqueous medium containing in addition a water-soluble initial stage condensation product of urea and formaldehyde.

8. A process for the production of adhesives from condensation products of urea and formaldehyde which comprises subjecting a still water-soluble initial stage condensation product of about one mole of urea and two moles of formaldehyde after drying, to a thermal treatment in which said condensation product is heated to a temperature between 100° C. and 120° C. until it is practically insoluble in cold water but substantially only dispersible in water with swelling, and then dispersing the thus obtained product in an aqueous medium containing in addition, a water-soluble initial stage condensation product of urea and formaldehyde.

9. A process as claimed in claim 5 wherein the thermally after-treated condensation product of urea and formaldehyde is dispersed in an aqueous medium containing in addition, a member of the group consisting of water-soluble initial stage condensation product of melamine and formaldehyde and a water-soluble initial stage condensation product of urea and formaldehyde.

10. A urea formaldehyde condensation product which is practically insoluble in cold water but is substantially only dispersible in water with swelling, obtained by subjecting an initial stage condensation product of urea and formaldehyde, wherein the mole ratio of urea to formaldehyde is approximately in the range of 1:1.75 to 1:2.5 and which is still soluble in water after drying, to a thermal treatment in which said dried condensation product is heated to a temperature between 100° C. and 200° C. until it is practically insoluble in cold water but is substantially only dispersible in water with swelling.

11. A urea formaldehyde condensation product which is practically insoluble in cold water but is substantially only dispersible with swelling in water obtained by spray drying an aqueous solution of an initial stage condensation product of about one mole of urea and two moles of formaldehyde and which is still soluble in water after drying, and heating the obtained powder for about one to three hours to a temperature between 100° C. and 120° C.

References Cited in the file of this patent
UNITED STATES PATENTS

| 2,447,621 | Smidth | Aug. 24, 1948 |
| 2,554,424 | Suen | May 22, 1951 |
| 2,554,475 | Suen et al. | May 22, 1951 |
| 2,592,510 | Casebolt | Apr. 8, 1952 |